(12) United States Patent
Hickl

(10) Patent No.: US 9,936,177 B2
(45) Date of Patent: Apr. 3, 2018

(54) SEAMLESS TILED DISPLAYS

(71) Applicants: BARCO N.V., Kortrijk (BE); BARCO CONTROL ROOMS GMBH, Karlsruhe (DE)

(72) Inventor: Peter Hickl, Ettlingen (DE)

(73) Assignees: BARCO N.V., Kortrijk (BE); BARCO CONTROL ROOMS GMBH, Karlsruhe (DE)

( * ) Notice: Subject to any disclaimer, the term of this patent is extended or adjusted under 35 U.S.C. 154(b) by 0 days.

(21) Appl. No.: 15/120,804

(22) PCT Filed: Feb. 26, 2015

(86) PCT No.: PCT/EP2015/053999
§ 371 (c)(1),
(2) Date: Aug. 23, 2016

(87) PCT Pub. No.: WO2015/128408
PCT Pub. Date: Sep. 3, 2015

(65) Prior Publication Data
US 2016/0366379 A1  Dec. 15, 2016

(30) Foreign Application Priority Data
Feb. 28, 2014 (GB) .................................. 1403516.6

(51) Int. Cl.
*H04N 9/31* (2006.01)
*G03B 21/56* (2006.01)
(Continued)

(52) U.S. Cl.
CPC ............. *H04N 9/3147* (2013.01); *G02B 3/08* (2013.01); *G03B 21/10* (2013.01); *G03B 21/56* (2013.01);
(Continued)

(58) Field of Classification Search
CPC ........ G03B 21/56; G03B 21/62; G03B 21/10; H04N 19/3147
(Continued)

(56) References Cited

U.S. PATENT DOCUMENTS 5,185,677 A   2/1993 Honda et al.
5,400,178 A * 3/1995 Yamada ................. G03B 21/62
                                                   359/443
(Continued)

FOREIGN PATENT DOCUMENTS

CN        1776461 A       5/2006
DE   202009015262 U1      3/2010
(Continued)

OTHER PUBLICATIONS

International Search Report (ISR) dated Jul. 7, 2015, for PCT/EP2015/053999.
(Continued)

*Primary Examiner* — Christopher Mahoney
(74) *Attorney, Agent, or Firm* — Bacon & Thomas, PLLC

(57) ABSTRACT

A tile and tiled display system having at least two adjacent tiles each having a display screen with display pixels which are picture elements, whereby for colored displays each pixel is comprised of a plurality light emitting or light modulating elements. Each of the tiles has at least one first substrate of a first material and at least one first layer of a second material fixed to the first substrate where the thickness of the at least one first layer is less than the thickness of the first substrate; the coefficient of thermal expansion of the first substrate is less than the coefficient of thermal expansion of the at least one first layer and the distance between the at least two tiles is less than the size of a pixel on the display screen. The first substrates of adjacent tiles can be brought in mechanical contact.

23 Claims, 12 Drawing Sheets

(51) Int. Cl.
*G02B 3/08* (2006.01)
*G03B 21/10* (2006.01)
*G03B 21/62* (2014.01)
*G09F 9/35* (2006.01)

(52) U.S. Cl.
CPC ............... *G03B 21/62* (2013.01); *G09F 9/35* (2013.01); *H04N 9/3141* (2013.01)

(58) Field of Classification Search
USPC .......... 359/443, 449, 460; 345/4–5, 1.1, 1.3, 345/2.3, 173
See application file for complete search history.

(56) References Cited

U.S. PATENT DOCUMENTS

| | | | |
|---|---|---|---|
| 6,519,085 B2 * | 2/2003 | Brandt | H04N 9/12 348/789 |
| 6,630,235 B2 * | 10/2003 | Oshima | B32B 17/10064 428/332 |
| 6,700,701 B1 | 3/2004 | Son et al. | |
| 8,284,487 B1 | 10/2012 | Liu | |
| 9,013,790 B1 * | 4/2015 | Kazmierski | G03B 21/567 359/443 |
| 2005/0068617 A1 | 3/2005 | Mizuno et al. | |
| 2009/0190211 A1 | 7/2009 | Kodama et al. | |
| 2010/0327185 A1 * | 12/2010 | Kindler | G09F 9/30 250/462.1 |
| 2011/0080723 A1 | 4/2011 | Kaluzhny | |
| 2013/0176623 A1 | 7/2013 | Hajjar et al. | |
| 2015/0138484 A1 * | 5/2015 | Watanabe | G02F 1/133308 349/58 |

FOREIGN PATENT DOCUMENTS

| | | |
|---|---|---|
| EP | 0376332 A2 | 7/1990 |
| EP | 0523427 A1 | 1/1993 |
| EP | 0650295 A1 | 4/1995 |
| EP | 1012666 B1 | 10/2001 |
| JP | 2007-093867 A | 4/2007 |
| WO | 95/28664 A1 | 10/1995 |
| WO | 00/75912 A2 | 12/2000 |

OTHER PUBLICATIONS

Written Opinion dated Jul. 7, 2015, for PCT/EP2015/053999.
International Preliminary Report on Patentability (IPRP) dated Jul. 5, 2016, for PCT/EP2015/053999.
Second Written Opinion dated May 20, 2016, for PCT/EP2015/053999.
British Search Report dated Jun. 12, 2014, for GB 1403516.6.
British Office Action dated Jun. 1, 2017, for GB 1403516.6.
Chinese Office Action for corresponding CN 201580011183.X dated Dec. 20, 2017.

* cited by examiner

SEAMLESS TILED DISPLAYS

The present invention relates to tiled display, to display tiles and to methods of manufacturing and operating these including any software or controllers required to drive such displays.

BACKGROUND

FIG. 1 shows a diagrammatic representation of a rear projection set-up known from the prior art by means of a projector P, where a Fresnel lens F is disposed in front of the projection screen P. A brightness which is more regular for a viewer V from a particular angle of view can be brought about in this way.

The projection screen P consists of a plastic material, for example polymethyl methacrylate (PMMA), associated with a diffuser. The diffuser is obtained e.g. by sand blasting the output surface (the surface seen by the viewer) of the projection screen or by mixing small particles (e.g. titanium dioxide) in a resin before polymerization.

In tiled rear projection setup, several rear projection modules each with a screen P are disposed next to each other is a checkerboard manner to form a larger projection screen as seen on FIG. 2.

FIG. 2 also shows schematically how the picture elements are arranged on the projection screen P. The projection of an image depicted by a light valve (e.g. LCOS, LC or micromirrors aka DMD) unit is involved. Three sub-pixels green, red and blue lie close to one another and produce in their totality a picture element of the image displayed. The picture elements follow one another with a spacing A. The broken line indicates the inner area of the projection screen P onto which light can be projected in projection set-up known from the prior art. It becomes clear from this representation that it is not necessary to construct the rear projection modules in such a way that the picture elements butt directly against one another at the edges of the projection screens P, since it is sufficient by virtue of the pixel structure of the displayed image if the realizable spacing between two adjacent picture elements projected onto adjacent projection screens corresponds roughly to the spacing A of the picture elements on the projection screen P. In the prior art the spacing between two adjacent picture elements projected onto adjacent projection screens is largely determined by the distance separating two adjacent projection screens P. The space between two adjacent projection screens P is often referred to as the seam. When the light valve is a DMD, there are not necessarily red, green and blue sub-pixels. In that case, each of the color components is projected sequentially and occupies the entire area of a pixel. Instead of being projected sequentially, the color components can be projected simultaneously on top of each other, each color component of an image is formed by a DMD, the projector having 3 DMDs to form a color image.

The minimum distance between two adjacent projection screens depends on the clearance needed to allow thermal and humidity expansion of the projection screens P without misalignment, bowing or damaging of the projection screens P.

The problem of thermal and humidity expansion and the relative movement of tiles with respect to each other and its impact on the inter-tile seams is well known in the art too.

In U.S. Pat. No. 5,400,178 "Screen unit for rear projection picture display system, method for producing the same and component to be used for assembling the screen unit" the problem of thermal expansion is addressed by using materials with approximately the same coefficients of thermal expansion. Nevertheless, the differential thermal expansion is still too large for seamless tiled displays where the width of the inter-tile seams must be equal or smaller than the distance between two adjacent pixels on the same tile.

In U.S. Pat. No. 5,185,677 "Transmission type projection screen assembly" a tensioning mechanism is used. The mechanism comprises force receiving blocks made of a material with a coefficient of thermal expansion substantially equal to that of the sheets of which the screen tiles are made.

But for tiled display with more than one row of adjacent screens, the tensioning mechanism cannot be hidden from the viewer. The mechanism proposed in U.S. Pat. No. 5,185,677 thus does not allow the assembly of large, multi-rows seamless tiled displays.

The effect of atmospheric conditions is important not only for multi-screen displays assembled from basic units but also for the multi-screen displays from the prior art and in which larger screens are obtained by joining together smaller screens, for example by adhesive bonding.

The basic units of the prior art which have been described above often have a frame around the screen, which frame holds this screen flat, often also serves to attach the screen to the housing of the basic unit and protects the edges of the screen from damage. This frame prevents an image from being projected all the way as far as the outer edge of the front side of the basic unit and makes the visual joint or seam between the basic units larger. EP-0 650 295 and EP-0 523 427 describe basic units of this nature and the assembly of a plurality of basic units of this nature to form a multi-screen display. A solution for allowing images to be projected right up to the edge of the front side of the basic unit is described in WO 95/28664 and consists in a special treatment of the outer edges of the screen and a special attachment of the said screen to a supporting structure, so that the light from the projector is able to reach the front edges of the screen—which are also the front edges of the basic unit—without being impeded. In principle, it is possible to achieve a perfect connection between screens of basic units at a specific temperature. However, the edges of a basic unit of this nature are fragile during transportation and the other drawbacks which are inherent to the assembly of basic units continue to exist.

Another solution is to adhesively bond together relatively small optical screens to form larger screens. Adhesively-bonded larger screens of this nature cannot be produced at the location where the projection screen is to be installed, but rather can be produced only at the premises of the constructor, following which they have to be transported in very robust and large packaging. In order to prevent damage and contamination to the screens during attachment to a supporting structure, installation has to take place with the greatest possible care. Under the influence of atmospheric conditions (ultraviolet radiation, repeated temperature changes, absorption of humidity, oxidation . . . ) the mechanical and optical properties of the glue will change and the seams will become more discernible.

When gluing to produce an adhesive bond, a pressure is used to squeeze the glue out into a thin continuous film between layers, to force air from the joint, to bring the surfaces into intimate contact with the glue, and to hold them in this position during the setting of the glue.

This is the traditional gluing strategy because a) The glue material itself is not very strong so it is not a good idea to have a large thickness of glue. Instead the glue should be a very thin layer with the glue sticking very well to a well prepared surfaces.

b) To do this the surfaces must be very flat, perfectly clean and must be clamped together as strongly as possible until the glue dries The glue is squeezed out (step 1) and also the surfaces have to be held together under pressure (step 2).

Step 1 can be messy during production and requires the surfaces to be cleaned and step 2 slows down production and hence increases production time and increases costs of production.

The pressure applied can break fragile substrates, e.g. made from glass. In order to reduce the weight of large tiled displays there is an interest in reducing the thickness and weight of all components.

Liquid glue is not compatible with the slanted/lateral gluing surfaces. The glue would have an irregular thickness (which would impact the gap/seam between display tiles) and on occasion is known to flow/to seep between layers (e.g. between a Fresnel lens and a substrate above it). Such glue can forms stains and visible artefacts.

One advantage of bounded heat activated adhesive such as heat activated adhesive tapes is that the heat activity (i.e. a combination of temperature and activation time) can be well controlled such that thermal damage to other components can be reduced or avoided while still having excellent structural adhesive properties. For example, bounded heat activated adhesive such as heat activated adhesive tapes as used with embodiments of the present invention can be activated at temperatures of up to 120° C. with an activation time of less than 90 sec. A higher activation time can be used if the temperature is lower. The activation time becomes less of a problem if the temperature is reduced to typical polymer glass temperature such as 70° C.-80° C. Such very low temp systems are less preferred. So that a reasonable range of activation temperature is 100 to 140° C. with an activation time of less than 30 seconds at 140° C. and less than 90 seconds at 120° C. activation time.

The screen panels are preferably optical panels, such as a Fresnel lens, a lenticular or a combination of the two and have a perfectly rectilinear edge. They may comprise a plurality of layers, of which at least one layer is attached to the attachment plates with the aid of joining wires. In order to draw the screen panels towards one another and to position them with respect to one another, and in order to fix these screen panels to and position them with respect to the attachment plates, use is preferably made of rigid joining wires which are U-shaped and are made from metal or plastic.

The seams between the screen panels which have been drawn towards one another are minimal, with a size of less than half a millimeter. Drawing the panels together by means of joining wires ensures that the seams between the screens are always, and remain, minimal, in spite of manufacturing tolerances and under changing climatological conditions, such as temperature and relative atmospheric humidity. Any differences in expansion/shrink between the screen panels, on the one hand, and the supporting structure of the projection screen, on the other hand, are absorbed by the fact that the attachment plates which join together the screen and the supporting structure are deformable and/or have a movable join to the supporting structure, and the fact that the joining wires can be deformed to a limited extent in order to keep the join between the screen panels optimal. As a result, the screen can move with respect to the supporting structure, within certain limits, in such a way that the seams remain minimal. However, the stitching wires in the stitched screens disclosed in EP 1 012 666 B1 "PROJECTION SCREEN FOR IMAGE REPRODUCTION DEVICES WHICH ARE POSITIONED NEXT TO AND/OR ABOVE ONE ANOTHER" are easily discernible. Also the installation effort is high, projectors must be readjusted if environmental conditions are changing and the wall size is practically limited

SUMMARY OF THE INVENTION

It is an object of the present invention to provide an alternative tiled display, display tile or methods of manufacturing and operating these including any software or controllers required to drive such displays.

An advantage of some embodiments is to reduce the possibility that a tile can move with respect to the supporting structure, e.g. so that the seams are small or remain minimal.

An advantage of embodiments of the present invention is the provision of at least two or three or all of the following advantages for a connection between a support and a substrate:

a) Shear strength of joints
b) Shear creep of joints
c) Size of glued area
d) The arrangement of the surfaces glued, e.g. sloping
e) Choice of glue, e.g. a bounded heat activated adhesive
f) Reduction in pressure during manufacture thus reducing the breakage of thin brittle substrates, increasing manufacturing yield and reducing overall weight,
g) The reduction in weight also reduces loads on the connection of the frame to a substrate.

An object of the present invention is to provide a mechanical design of the mating and joining surfaces between a support and a substrate which does not make a shadowing problem worse, while making the surface area for fastening large and resistant to long term creep and shear, providing a design which allows the provision of small and accurate seams between tiles to improve appearance, reducing pressures applied during manufacture, reducing the weight of components, increasing yield when using thin brittle substrates.

An advantage of some embodiments is that they allow the assembly of large, multi-rows seamless tiled displays.

An advantage of some embodiments is that the impact of thermal and humidity expansion and the relative movement of tiles with respect to each other on the inter-tile seams can be reduced. This allows the use of thin brittle substrates and reduces weight of components.

An advantage of some embodiments is that the installation effort can be reduced. An advantage of some embodiments is that projectors require less readjustment if environmental conditions are changing.

According to an aspect of the present invention, there is provided a tiled display system comprising at least two adjacent tiles, each being associated with or having a display screen with display pixels which are picture elements, whereby for coloured displays each pixel is comprised of a plurality light emitting (e.g. LED) or light modulating (e.g. LCD), elements (e.g. RGB—see FIG. 1) each of the tiles having at least one first substrate of a first material and at least one first layer of a second material fixed to the first substrate characterized in that the thickness of the at least one first layer is less than the thickness of the first substrate; the coefficient of thermal expansion of the first substrate is less than the coefficient of thermal expansion of the at least one first layer and the distance between the at least two tiles is less than the size of a pixel on the display screen.

Embodiments of the present invention are not limited to video walls based on projection. They can also be used to allow a seamless tiling of direct view displays like liquid crystal displays or OLED displays. Conventional displays usually have a considerable seam of several millimetres causing large unsightly gaps in a related video wall.

According to another aspect of the present invention, the first substrates of adjacent tiles can be brought in mechanical contact with each other in order to reduce the seam between tiles to the minimum possible. If the distance between two adjacent tiles is smaller than a distance "A" between two adjacent pixels on a tile T, the realized tiled display is considered seamless.

According to another aspect of the present invention, the coefficient of thermal expansion of the substrate of the at least two tiles is lower or equal to 9.5 $10^{-6}$ /°K. between 273° K and 373° K. This allows the reduction of the seams to a minimum over a larger interval of temperature.

According to another aspect of the invention, the first layer of second material has a Fresnel lens. For example the first layer of second material is modified, e.g. by engraving to form the Fresnel lens. This is particularly relevant for tiled rear projection display systems.

The first layer of second material can be molded into a Fresnel lens. The obtained Fresnel lens can then be fixed, e.g. glued or laminated on the first substrate. Alternatively, the Fresnel lens is molded after the first layer has been fixed, e.g. glued or laminated on the first substrate.

Alternatively the first layer of second material is deposited as a resin on the first substrate before being molded into a Fresnel lens and is optionally cured on the first substrate.

In another aspect of the invention, the first substrate supporting the Fresnel lens is associated with another substrate supporting another functional layer. In that aspect of the invention, each display tile has a second substrate and a second layer fastened to the second substrate. The second substrate can be made of the same material as the first substrate or can be made of a third material. The second layer will generally be made of a fourth material different from the first or third materials.

The second layer is fixed, e.g. usually glued or laminated on the second substrate or deposited on the second substrate before being cured.

In another aspect of the invention, the Fresnel lens is directly engraved in the first substrate.

In accordance with embodiments of the present invention, the first and second substrates of each tile can be fastened together, e.g. by use of a bounded heat activated adhesive. A pressure sensitive structural adhesive tape is less preferred as use of pressure can damage thin brittle substrates such as glass. Glass is a heavy material and making it thinner would be an advantage as it reduces cost of the display tiles, and reduces weight. A bounded heat activated adhesive is one where flow of the adhesive is bounded, i.e. restricted to bounds. A bounded heat activated adhesive can be, for example, a temperature activated adhesive tape or a temperature activated glue dispensed on a thin carrier foil.

One advantage of bounded heat activated adhesive such as heat activated adhesive tapes is that the heat activity (i.e. a combination of temperature and activation time) can be well controlled such that thermal damage to other components can be reduced or avoided while still having excellent structural adhesive properties. For example, bounded heat activated adhesive such as heat activated adhesive tapes as used with embodiments of the present invention can be activated at temperatures of up to 120° C. with an activation time of less than 90 sec. A higher activation time can be used if the temperature is lower. The activation time becomes less of a problem if the temperature is reduced to typical polymer glass temperature such as 70° C.-80° C. Such very low temp systems are less preferred. So that a reasonable range of activation temperature is 100 to 140° C. with an activation time of less than 30 seconds at 140° C. and less than 90 seconds at 120° C. activation time.

Embodiments of the present invention one or more of the following advantages
a) have increased area of joint surface by sloping the surfaces, i.e. angling them with reference to the optical axis of the display tile
b) while keeping joining surfaces closely parallel and
c) use a bounded temperature activated adhesive, e.g. in tape form which does not migrate or flow while providing a strong connection, and
d) in addition keep the shadow on the edge to a low value and ideally as small as possible by means of the sloping or chamfered edge of the substrate, and
e) the connection of the frame on both sides has a sloping or chamfered jointing surface which, on one side is opposite to the slope on the other side of the display tile such that there is no fracture line or shear surface parallel to the optical axis of the display and/or along a vertical direction when the display is installed
f) the pressure exerted on substrates during manufacture is reduced allowing use of thinner brittle substrates such as glass which reduces weight and increases yield thus reducing costs and also reducing loads on the connection of the frame to a substrate.

Embodiments of the present invention have an increased glue area, with an opposing slope direction of the chamfer on opposing edges (lateral sides) of the tile which means that the connections of the substrate to its support do not have shear planes that are parallel to the optical axis of the display tile or perpendicular to the optical axis in at least one direction and preferably in two orthogonal directions so that the substrate cannot slide vertically along a shear plane. The slope of the chamfer on the edge (lateral side) of the support makes for better optical design at the edges.

Accordingly in an aspect of the invention, in accordance with embodiments of the present invention, at least one of the first and second substrates is fastened to a support frame, e.g. by a bounded heat activated adhesive. A pressure sensitive structural adhesive tape is less preferred for reasons given above, namely the risk of breakage of brittle substrates causing the use of thicker and heavier plates. A bounded heat activated adhesive is one where flow of the adhesive is bounded. A bounded heat activated adhesive can be a temperature activated adhesive tape or a temperature activated glue dispensed on a thin carrier foil. The surface for fastening at least one of the first and second substrates to the support frame is a join surface that extends from an edge of a tile display inwards towards the center of the tile at an acute angle to the optical axis of the display tile. The optical axis is assumed to be perpendicular to the major surface of the substrate or tile. Opposing edges (lateral sides) of a tile have surfaces for fastening at least one of the first and second substrates to the support frame whereby each join surface extends from an edge of a tile display inwards towards the center of the tile at an acute angle to the optical axis of the display tile. The edges (lateral sides) of the substrate are chamfered. If the display has four sides and each is edge (lateral side) is chamfered inwards, then the substrate is in the form of a truncated base of a pyramid. This results in two opposing (diametrically opposite) join surfaces at the edges (opposing lateral sides) of the substrate of the display tile which slope inwards with opposing angles so that a shear line parallel to the optical axis is not formed. Preferably, the tile has two chamfered join surfaces at the top and bottom edges of the substrate when the display tile is installed which slope inwards with opposing angles so that a shear line perpendicular to the optical axis in the vertical direction when the display is installed is not formed.

By using a bounded heat activated adhesive such as a heat activated tape, the thickness is controlled (because unlike liquid glue there is not the production problem of too little or too much glue and the operator sensitivity involved therewith) which is important to control the dimensions of the gap between tiles and the bounding of the adhesive means there is no "seeping" of glue during manufacture or afterwards. In accordance with embodiments of the present invention, the gluing is provided with a larger surface, e.g. to provide a stable support for display tiles of 1.5 m diagonal and several kilograms per tile, each having 10 or more substrates with thickness of 1 to 3 mm. Embodiments of the present invention provide gluing preferably done along the chamfered edges (lateral sides) of a display tile to a support with a larger surface and hence experiencing lower shear forces. When installed the weight of the tile is applied perpendicularly along at least 2 edges, rather than almost exclusively laterally. The use of an adhesive method that does not involve high pressures reduces the risk of damage to brittle substrates such as glass thus reducing overall weight and the long term load on connections.

Alternatively the bounded heat activated adhesive such as a heat activated adhesive tape can be used to fasten the substrate to a mechanical fastening element. In particular, the same bounded heat activated adhesive such as the adhesive tape can be used to fasten two substrates together as is also fastening the substrates to the mechanical fastening element.

In another aspect of the invention, the first substrate acts as a carrier and supports a liquid crystal image forming device.

The present invention also provides a tile for a tiled display arrangement, the tile having a display screen with pixel locations and is adapted so that the distance between two adjacent tiles is less than the size of a pixel location on the display screen, comprising: at least one first substrate of a first material and at least one first layer of a second material fixed to the first substrate characterized in that the thickness of the at least one first layer is less than the thickness of the first substrate; the coefficient of thermal expansion of the first substrate is less than the coefficient of thermal expansion of the at least one first layer.

The present invention also provides a method of making a tiled display arrangement having at least two adjacent tiles, each tile having a display screen with pixel locations, each of the two adjacent tiles having at least one first substrate of a first material, the method comprising:

fixing at least one first layer of a second material to the first substrate characterized in that the thickness of the at least one first layer is less than the thickness of the first substrate; the coefficient of thermal expansion of the first substrate is less than the coefficient of thermal expansion of the at least one first layer and the distance between the at least two tiles is less than the size of a pixel location on the display screen.

DETAILED DESCRIPTION OF THE INVENTION

Figure 1:
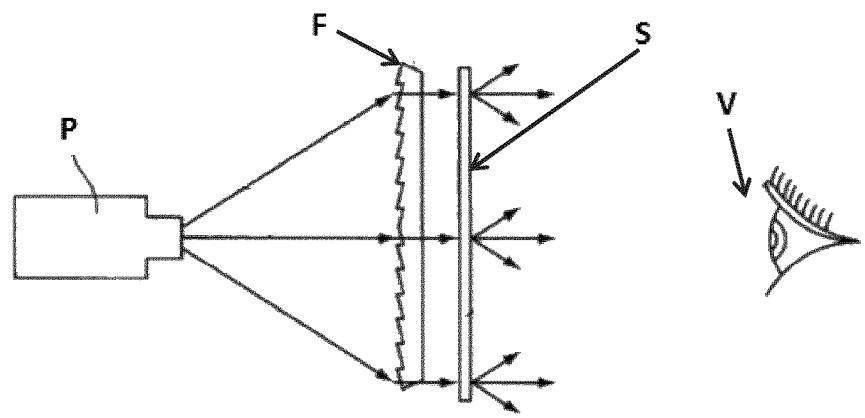
FIG. 1. Schematic representation of a rear projection system.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, horizontal, vertical and the like in the description and the claims are used usually to describe a carpet that is laid horizontally unless another meaning is assigned to them.

In the drawings, like reference numerals indicate like features; and, a reference numeral appearing in more than one figure refers to the same element.

The invention is related to a display tile T and a tiled display like e.g. a rear projection tiled display or a tiled liquid crystal display.

The invention is related to a design of a display tile T that keeps its form and flatness, has only a small or negligible thermal expansion regardless of its environment (high humidity, temperature fluctuations . . . ) and will stay aligned with adjacent display tiles in a tiled display. To that end, a stable transparent carrier substrate 1 like for example glass is used. Advantageous characteristics are rigidity and strength, transparency, low cost, electrical insulator, availability in a variety of sizes and thicknesses. Glass can exhibit these characteristics. The glass is for instance soda lime glass. Other types of glass are possible. The coefficient of thermal expansion of the material used for the carrier substrate is advantageously lower than $9.5 \cdot 10^{-6\circ}$ $K^{-1}$. The substrate 1 has a first side, first major surface or entry face that is substantially planar. The entry face is the face or side of the substrate 1 through which the light projected by the projector or the backlight enters. The substrate 1 has a second side, second major surface or exit face that is substantially planar. The exit face is the face or side of the substrate 1 through which the light exits. The first side and second sides of the substrate 1 are substantially parallel. When a line or surface, in particular a plane, is said perpendicular to the substrate 1, it means that the line or surface is perpendicular to the first and second sides of the substrate 1.

Figure 3:
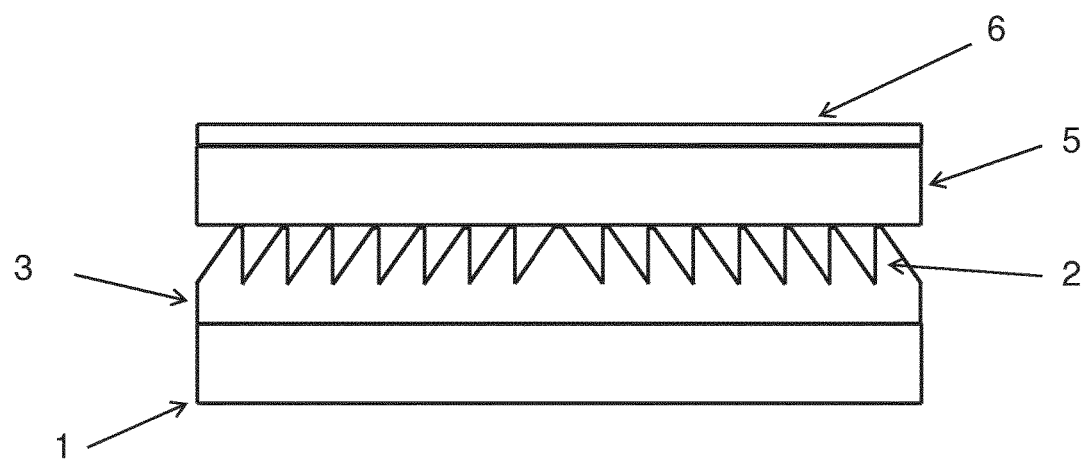
FIG. 3. Cross section of a display tile according to an embodiment of the invention.

A Fresnel lens 2 is provided on the substrate 1. The Fresnel lens 2 can be engraved directly on the substrate 1, for example. Alternatively, the Fresnel lens is realized in a thin polymer layer 3 that is fixed to, e.g. laminated or glued on the substrate 1 as seen from FIG. 3. The Fresnel lens can e.g. be formed by direct replication into a curable resin layer on which a mould is pressed. The resin can be deposited on the substrate 1 prior to the application of a mould. The resin can be deposited on an intermediary carrier surface distinct from the substrate 1, peeled away after application of a mould and laminated or glued on the substrate 1. The resin can be a soft resin such as silicone resin or a rubber or elastomer or it can be a hard resin such as acrylic resin. The selection of hard or soft materials is determined in function of the application and of the dimensions of the tile T. Table 1 (see below) gives an overview of the benefits of using a hard acrylic resin instead of a soft silicone resin.

The polymer layer 3 is preferably thinner than the "carrier" substrate 1. For instance, if the polymer layer 3 is 0.3 mm thick, the carrier substrate 1 can have a thickness of 1 mm, 2 mm or more. The ratio of the thickness of the carrier substrate and the polymer layer 3 to which it is associated is advantageously 1.8 or more up to for example 2.5, 3 or 5. The polymer layer and the substrate having in general different coefficient of thermal expansion, this dissimilarity in thickness reduces or prevents excessive bowing or buckling of the substrate over time when the temperature fluctuates. The substrate 1 being a stable material substantially unaffected by humidity, exposure to oxygen and temperature fluctuations, a display tile according to embodiments of the present invention and used in a tiled display can be in mechanical contact with adjacent display tiles. An advantage is that, alignment of the tiles is not jeopardised over time under fluctuating conditions of temperature, humidity and aging of the material of the substrate exposed to UV radiation and/or oxygen.

The highest precision for the lateral dimensions of the carrier substrate 1 and the polymer layer 3 are obtained by initially over-dimensioning both the carrier substrate 1 and the polymer layer 3. The polymer layer 3 is spread over an intermediary carrier layer to a thickness of e.g. 0.3 mm or more, moulded to form a thin Fresnel lens 2 and peeled away. At this stage the lateral dimensions of the Fresnel lens 2 are oversized by more than e.g. 1 mm. and in general by as much than 20 mm For instance, if the dimensions of a tile T are to be 1550 mm by 872 mm, the oversized tile T and Fresnel Lens 2 will be at least 1570 mm by 892 mm. The oversized Fresnel lens 2 is laminated or glued on the oversized carrier substrate 1. Once assembled, the oversized carrier substrate 1 and Fresnel lens 2 are cut to their final dimensions, e.g. by water jet. The inventor found out that water jet was the cutting technique that allowed reaching the best precision without degrading the carrier substrate or the Fresnel lens. The same technique is applied mutatis mutandis when the Fresnel lens is formed directly on the (oversized) carrier substrate. Alternatively, the Fresnel lens layer and the carrier substrate can be cut to dimensions separately before being assembled.

Table 2 (see below) summarizes the problem associated with various cutting methods tested by the inventor.

An anti-glare structure 4 can be provided e.g. etched on the face of the substrate 1 facing a projector in the tiled rear projection display of FIG. 1. In alternative embodiments, the anti-glare structure can be etched on the face of the substrate facing the viewer or on both face of the substrate.

The geometry and dimensions of a display tiles according to the invention reduces or prevents a change in the alignment of such tiles in a tiled display. Therefore the distance between two adjacent tiles can be minimized without risk of tiles exerting stress on each other caused by thermal extension. In particular, the distance between adjacent tiles in a rear projection tiled display screen can be smaller than the dimensions of a pixel on the rear projection tiled display screen e.g. 1 mm or less and preferably less than 0.5 mm.

In a rear projection tiled display screen according to embodiments of this invention, the distance between adjacent tiles can be reduced to a very low value or even zero i.e. adjacent tiles are in mechanical contact. This means that the carrier substrates of adjacent tiles can touch each other directly. In particular, the tiled display can be designed such that the carrier substrates of adjacent tiles will be in mechanical contact at the maximum temperature at which the display will be operated. When the temperature at which the display operates is smaller than the maximum temperature adjacent tiles may stop being in contact and the distance between two tiles may increase but it will always be a low value, e.g. smaller than what would be otherwise possible. A scattering layer and/or a contrast enhancement layer can also be provided, in particular for a rear projection display. A second substrate 5 similar or identical to the first substrate 1 can be used to support a second layer 6 with the required scattering and contrast enhancement properties. The layer 6 can be placed on the first side or on the second side of the substrate 5. The layer 6 is usually complemented by an anti-glare structure. The antiglare structure is usually realized on layer 6, e.g. as an additional film layer 6b superimposed on layer 6. Layer 6 and layer 6a are usually polymerized on an intermediary substrate and peeled-off.

The highest precision for the lateral dimensions of the carrier substrate 5 and the polymer layers 6 and 6b is obtained by initially over-dimensioning both the carrier substrate 5 and the polymer layers 6 and 6b. The polymer layers 6 and 6b are sequentially spread and polymerized over an intermediary carrier layer to a thickness of e.g. 0.3 mm or more and peeled away. At this stage the lateral dimensions of the polymer layers are oversized by more than e.g. 1 mm and usually by as much as 20 mm. For instance, if the dimensions of a tile T are to be 1550 mm by 872 mm, the oversized carrier substrate 5 and polymer layers 6 and 6b will be at least 1570 mm by 892 mm.

The oversized layers 6 and 6b can be fixed together such as laminated or glued (on top of each other) on the oversized carrier substrate 5. Once assembled, the oversized carrier substrate 5 and layers 6 and 6b are cut to their final dimensions, e.g. by water jet. The inventor found out that water jet was a very good cutting technique that had a combination of very important characteristics such allowing reaching the desired precision for a composite layer 6 and 6b without degrading the carrier substrate or the composite layer 6 and 6b. The same technique can be applied mutatis mutandis when the Fresnel lens is formed directly on the (oversized) carrier substrate.

Figure 4A:
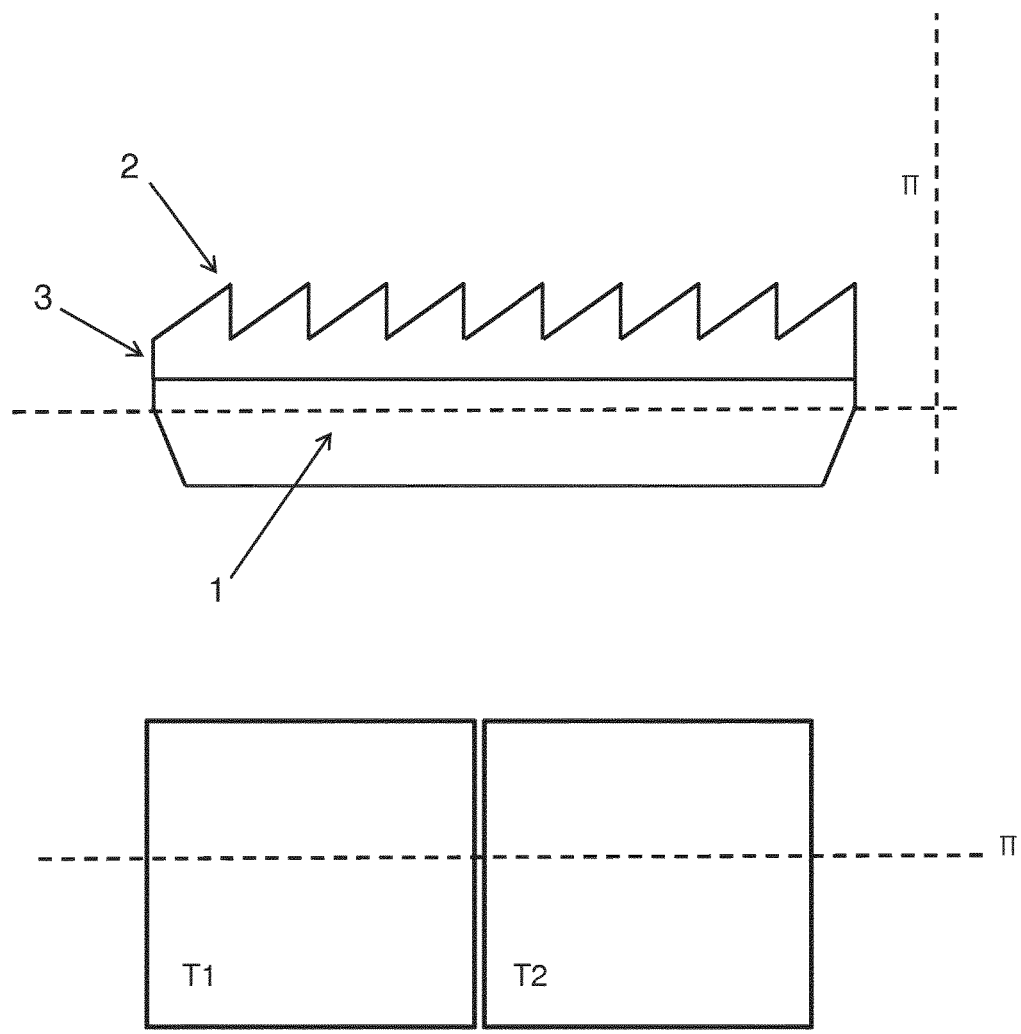
FIG. 4a. Example of chamfering of carrier substrate according to an embodiment of the invention.
Figure 4B:
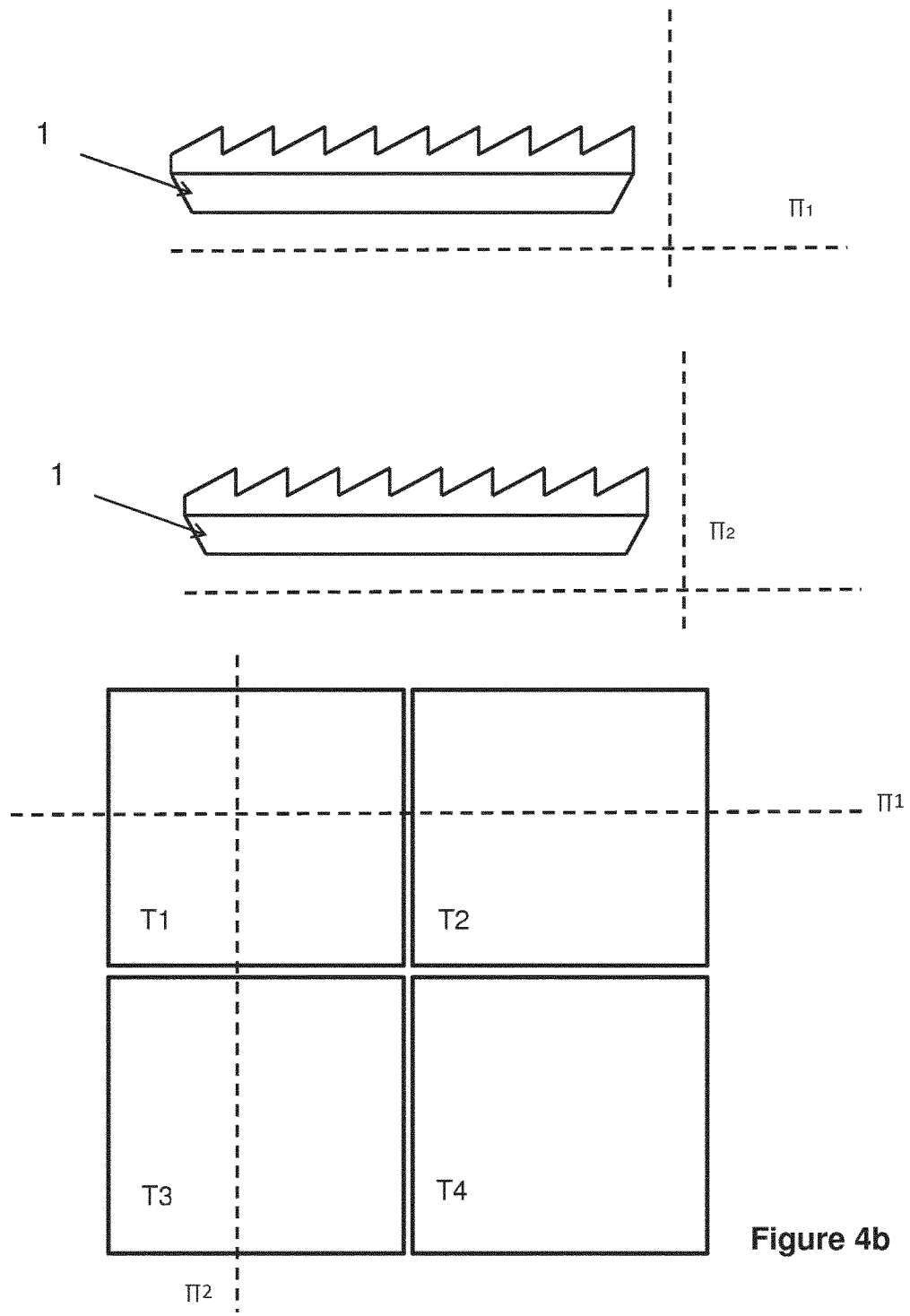
FIG. 4b. Example of chamfering of the carrier substrate according to an embodiment of the invention.

The cross section of the substrates 1 and 5 can be trapezoidal or hexagonal in at least one direction (e.g. for 1D tiling i.e. tiling in a row as in FIG. 4a) or in two perpendicular directions (for 2D tiling i.e. for tiling in several rows of more than one tile as in FIG. 4b or in other words when the display tiles are disposed in a checkerboard pattern).

The profiling of the carrier substrate 1 and/or 5 is preferably done by a machining technique such as grinding to reach the required accuracy.

In FIG. 4a, the cross section is done on plane Π.

In FIG. 4b, the cross sections are done on the planes $\Pi_1$ and $\Pi_2$, both planes being perpendicular to the substrate 1.

Figure 5:
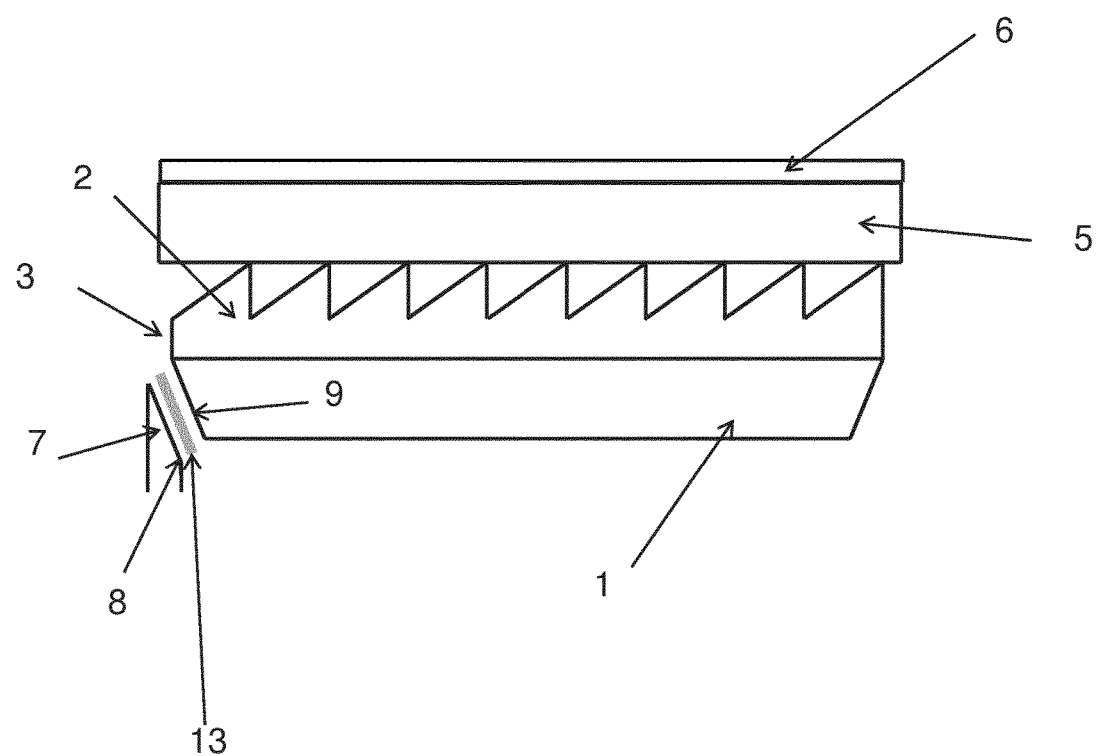
FIG. 5. Cross section of a tile and fastening mechanism according to an embodiment of the invention.
Figure 7:
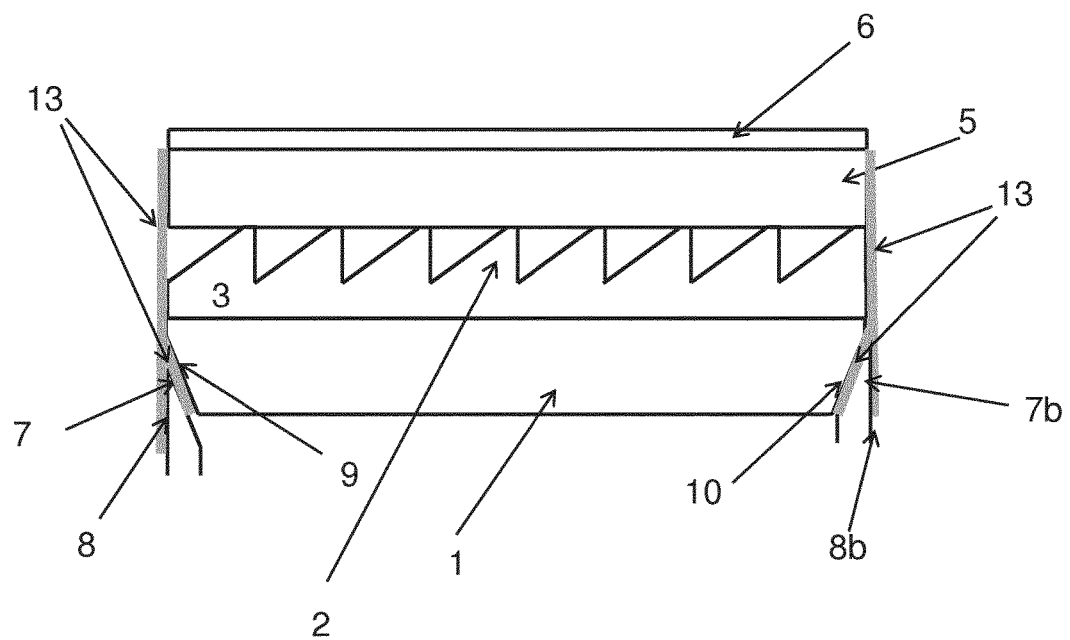
FIG. 7. Fastening of the two carrier substrates to the frame by means of adhesive tape according to an embodiment of the invention.
Figure 8:
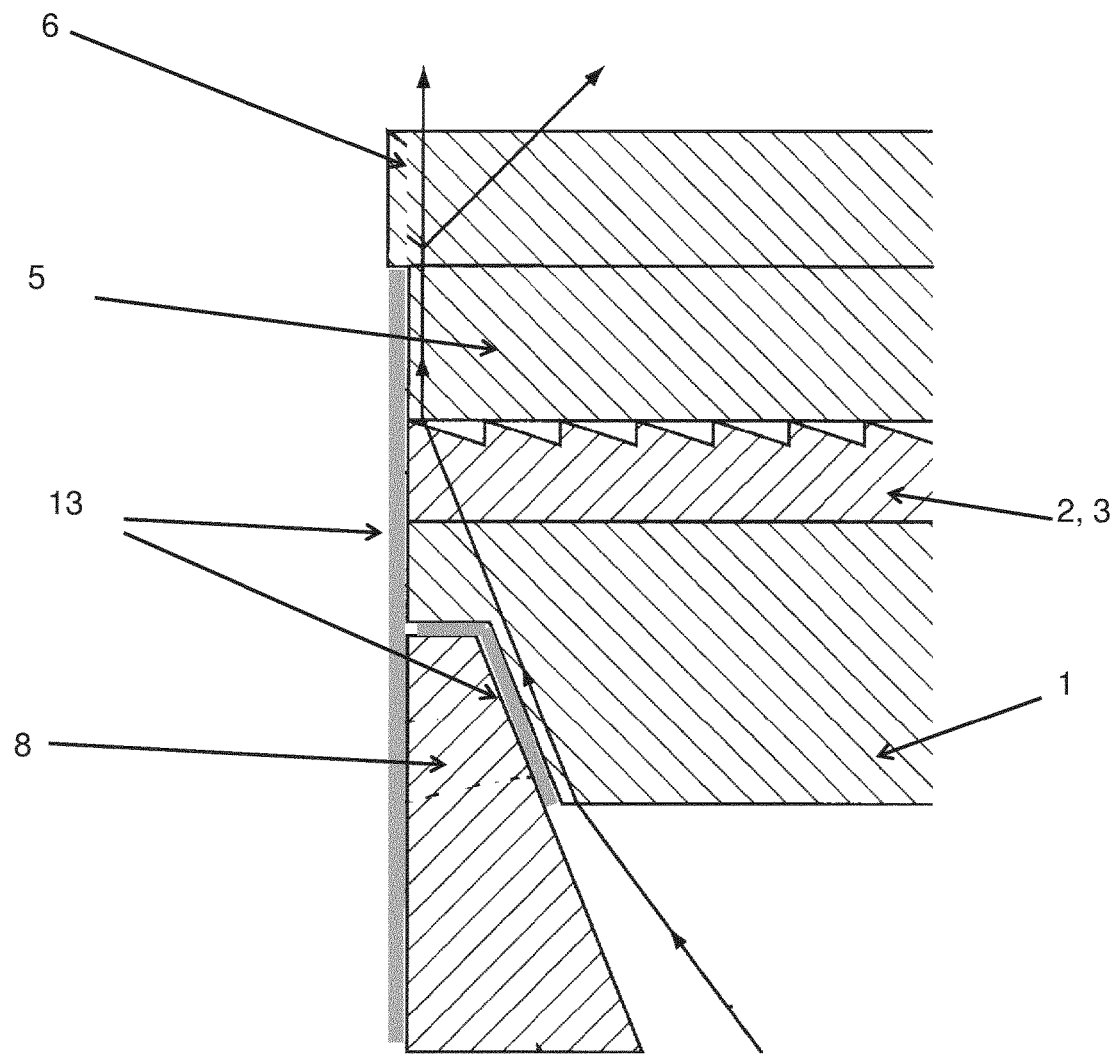
FIG. 8. Detail of chamfering of the carriers substrates and propagation of outermost light rays through substrates according to an embodiment of the invention.
Figure 9:
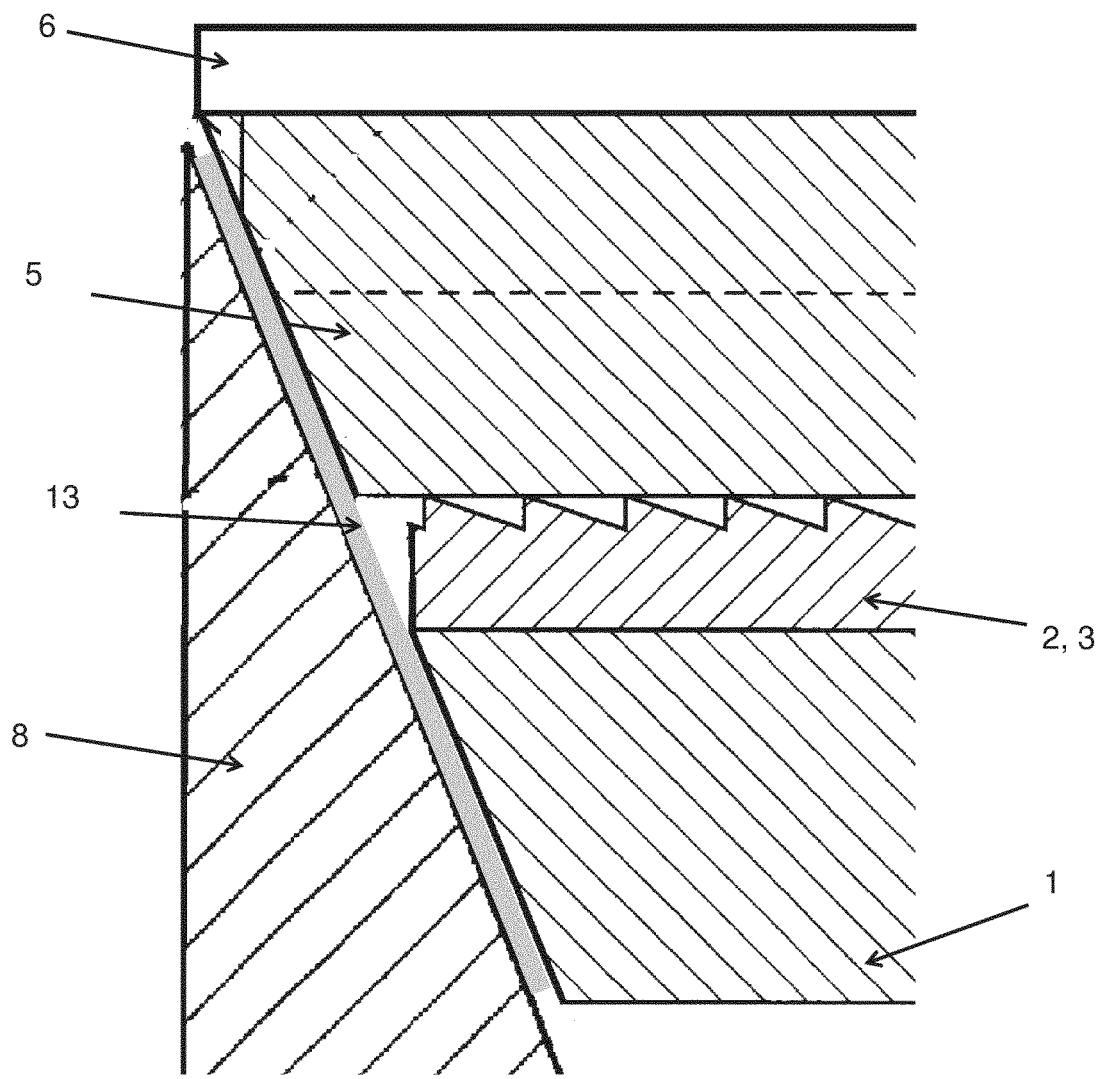
FIG. 9. Detail of chamfering of the carriers substrates and propagation of outermost light rays through substrates according to an embodiment of the invention.
Figure 12:
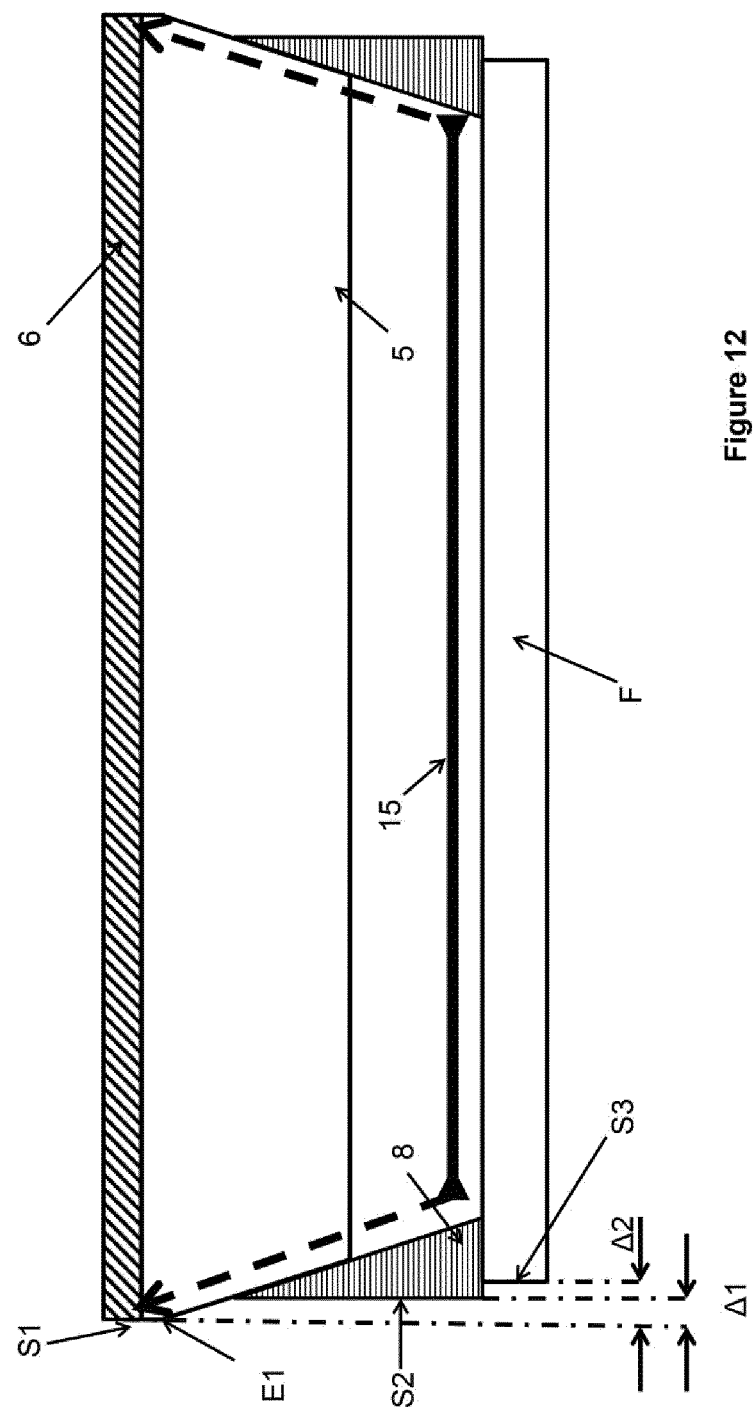
FIG. 12. Schematic cross section of a tile and the clearances between substrate and mechanical fastening elements and frame according to an embodiment of the invention.

More complex cross sections may result from chamfering of the edges such as chamfering the edges (lateral sides) of two or four (i.e. all) edges of substrate 1 in accordance with embodiments of the present invention, as e.g. shown in FIG. 4a or b, and/or FIG. 5 and/or FIG. 7 and/or as shown in FIG. 8 and/or in FIG. 9 and/or in FIG. 12. In some embodiments other substrates may be chamfered on two or more edges (lateral sides) as shown for substrate 5 in FIG. 9 and FIG. 12 as well as a matching slope or chamfer for mechanical fastening element 8 as shown in FIG. 5, and/or FIG. 7 and/or in FIG. 8 and/or in FIG. 9 and/or in FIG. 12.

The cross section of the carrier substrates plays an important role in the fastening of the substrates as will now be discussed.

A surface 7 of a mechanical fastening element 8 matches in slope with a part of, or with one of the lateral sides 9 of the substrate 1. For this purpose lateral side 9 of the substrate 1 is bevelled or chamfered in such a way that the joining surface makes an acute angle with respect to the optical axis of the display tile. The optical axis is assumed to be perpendicular to the major surface of substrate 1. This is the case except close to the edges (lateral sides) which however is not a determinant for the main optical axis. The acute angle shown in FIGS. 4a, 4b, 5, 7, 8, 9 and 12 is between a vertical and a line sloping downwards and towards the inner part of the display tile. For example in FIG. 9 the acute is defined between the surface on which tape rests to the vertical. This surface slopes down in the opposite direction to the exit optical direction which is upwards in these drawings. The same situation is present in FIGS. 4a, 4b, 5, 7, 8 and 12.

At least one surface 7b of another mechanical fastening element identical to element 8 matches a lateral side 10 of the substrate opposite to side 9 as depicted on FIG. 7. For this purpose this lateral side 9 of the substrate 1 is bevelled or chamfered in such a way that the joining surface makes an acute angle with respect to the optical axis of the display tile but the angles on opposite lateral sides are opposite so that the joining surfaces extend from the edge of the tile inwards and downwards as shown in the drawings. The effect of this, if it is done on all edges of a tile, e.g. on each of four edges, is that no shear plane is generated along which the mechanical fastening element 8 may creep with time.

Fastening of the substrate 1 to the mechanical fastening elements is done e.g. with glue on surface 7 and 7b. Sides 9 and 10 are obtained by chamfering the substrate 1. Liquid glue is less preferred. Most preferred is a bounded heat activated adhesive such as a heat activated adhesive film 13, advantageously used to fasten the substrate 1 to the mechanical fastening element 8 instead of (liquid) glue for reasons that have been explained above. The second substrate 5 may be glued to the truncated top of the Fresnel layers as represented on FIG. 5.

Figure 6:
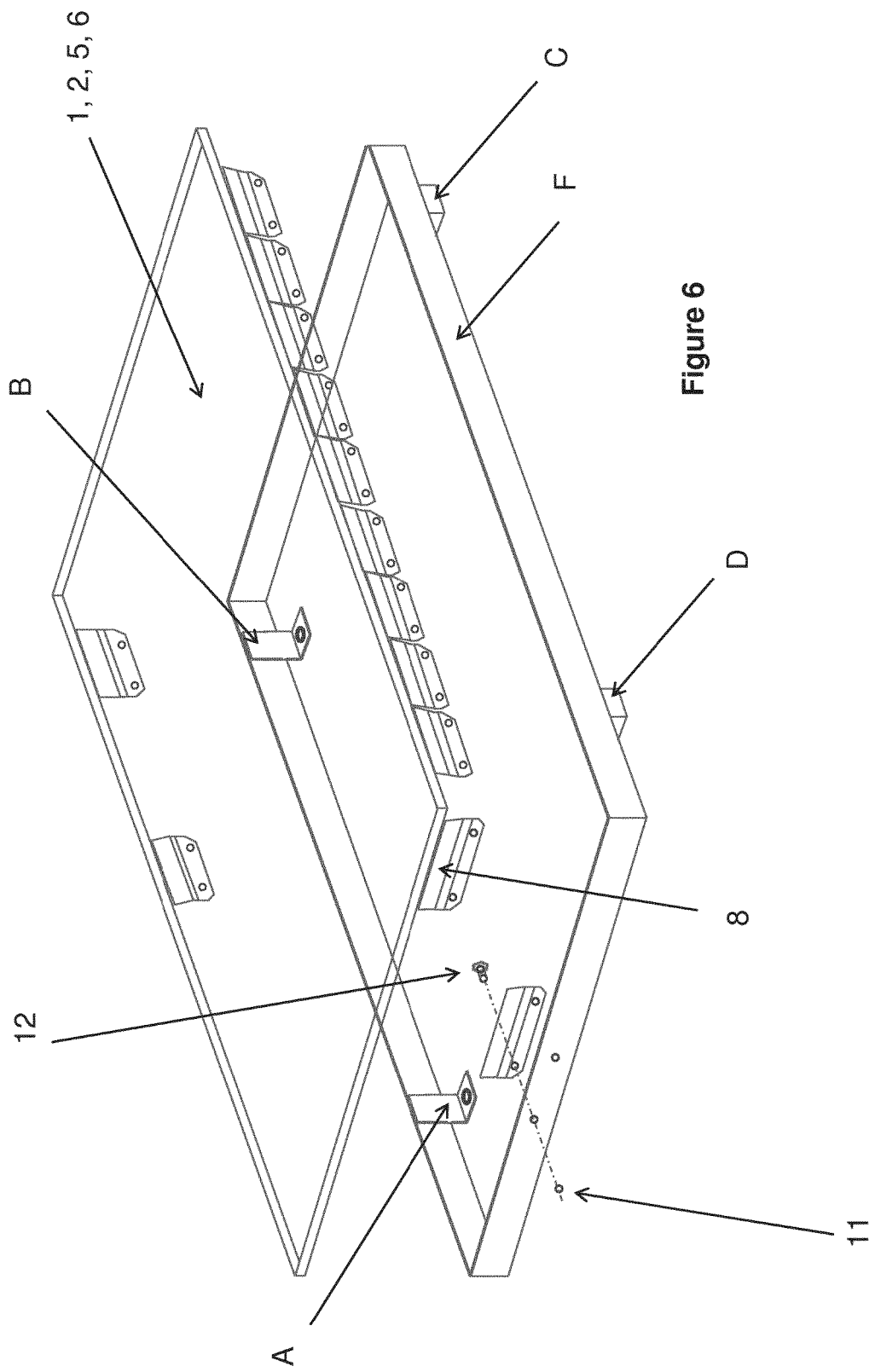
FIG. 6. Exploded view of a tile and the frame to which it is fastened according to an embodiment of the invention.

A perspective view of a tile according to an embodiment of this invention is given on FIG. 6. It is visible from FIG. 6 that the mechanical fastening elements 8 are positioned along the periphery of the substrate 1. The frame elements are mechanically fastened to a frame F (by means of e.g. nuts 11 and bolts 12) The frame F is used to fasten the tile T to a support structure that aligns and support identical tiles T forming a tiled display. Fastening to the support structure is done e.g. by means of mechanical fastening elements A, B, C and D. The support structure preferably has position adjustment means to adjust the position of each tile in the plane of the tiled display (e.g. plane determined by the tiles of the tile display). The position adjustment means may for instance allow translation of individual tiles in two perpendicular directions. The mechanical fastening elements A, B, C and D of a tile T are fastened to the position adjustment mean associated to the tile. To assemble the tiles into a tiled display, a first tile T1 is positioned. A second tile T2 is placed adjacent to T1 and its position within the plane of the tiles T1 and T2 is adjusted to align the tile by means of the position adjustment means of T2. A third tile T3 is placed next to T1 (T2 and T3 are on opposite sides of T1) and its position in the plane of the tiles is adjusted by means of the position adjustment means of T3 A fourth tile T4 is placed above T1 and its position within the plane of the tiles is adjusted etc.

In its simplest form, the position adjustment mechanism consists of a nut and bolt system where the bolt will pass through an opening larger than the diameter of the bolt. The movements of the tile are limited to the maximum excursion of the bolt in the opening. Once the tile is positioned, screws and bolts are tightened, and apply pressure on washers, one washer on each side of the opening. The washers move together with the bolt as the tile is displaced. Four sets of nut, bolt, washer and the corresponding openings in the support structure are associated to a tile to adjust its position.

Reliable assembly of substrate 1 and 5 usually requires truncating the Fresnel element. Fastening of the two substrates is done by e.g. gluing the bottom side of substrate 5 to the top of the truncated Fresnel element on the periphery of the Fresnel lens layer. It is advantageous to fasten the two carrier substrate together with an adhesive film 13 overlapping the sides of both substrate 1 and 5. This is illustrated by FIG. 7. In an alternative embodiment, the layer 6 is positioned between the Fresnel lens 3 and the second carrier substrate 5 as on FIG. 3b.

An example of a bounded heat activated adhesive is an adhesive film 13 as described in the German Utility Model DE202009015262U1 "Latent reaktive, hitzeaktivierbare Klebmasse and damit hergestellte Klebemittel". Heat activation can be done e.g. by near infrared heating or hot air (as provided by a heat gun).

One advantage of bounded heat activated adhesive such as heat activated adhesive tapes is that the heat activity (i.e. a combination of temperature and activation time) can be well controlled such that thermal damage to other components can be reduced or avoided while still having excellent structural adhesive properties. For example, bounded heat activated adhesive such as heat activated adhesive tapes as used with embodiments of the present invention can be activated at temperatures of up to 120° C. with an activation time of less than 90 sec. A higher activation time can be used if the temperature is lower. The activation time becomes less of a problem if the temperature is reduced to typical polymer glass temperature such as 70° C.-80° C. Such very low temp systems are less preferred. So that a reasonable range of activation temperature is 100 to 140° C. with an activation time of less than 30 seconds at 140° C. and less than 90 seconds at 120° C. activation time.

Bounded heat activated adhesives such as heat activated adhesive films not being fluid like glue, it is easier to control the thickness of the adhesive film 13 that will contribute to the seam between adjacent tiles. As can be inferred from FIGS. 7, 8 and 9; a good control of the thickness is necessary and is provided by embodiments of the present invention to control the seam between adjacent tiles.

Bounded heat activated adhesives such as heat activated adhesive films are also easy to apply and cause a significantly reduced or no risk of glue penetration between layers or in the grooves of the Fresnel lens. This is very important because glue penetration would cause visual artefacts. In an alternative embodiment, both substrates 1 and 5 are chamfered preferably on all edges and fastened to the frame elements 8 and 8b as seen on FIG. 8. For this purpose lateral sides of at least part of or all of both substrates 1 and 5 are bevelled or chamfered with matching sloping surfaces of frame elements 8 and 8b in such a way that the joining surface makes an acute angle with respect to the optical axis of the display tile but the angles on opposite sides are opposite so that the joining surfaces extend from the edge of the tile inwards and downwards as shown in the drawings. The effect of this if it is done on all edges of a tile, e.g. on each of four edges, is that no shear plane is generated along which the mechanical fastening element may creep with time. Also a good control of the thickness of the adhesive layer 13 allows for a better control of the distance between two adjacent tiles. FIG. 7, FIG. 8, FIG. 9 and FIG. 12 show an alternative technique to fasten together the two carrier substrates 1 and 5 and the mechanical fastening elements 8 with bounded heat activated adhesives such as heat activated adhesive films 13. In FIGS. 7 and 8 the substrate 1 is chamfered but not completely across its thickness. in FIG. 9 substrates 1 and 5 are chamfered acrosstheir thicknesses. Optical element 2, 3 is however optionally not chamfered. As shown in FIG. 12 substrate 1 is completely chamfered and substrate 5 is not completely chamvered on the edges. In addition use of bounded heat activated adhesives reduces pressures during manufacture resulting in the use of thinner brittle substrates and lower weight with higher yields.

The above described concept is not limited to video walls based on projection. It can also be used to allow a seamless tiling of direct view displays like liquid crystal displays or OLED displays. These Displays have a considerable seam of several millimetres causing huge gaps in a related video wall.

In any of the embodiments of the present invention the Fresnel lens element might be replaced by another light guiding and image magnification functionalities. Some of the needed functionalities can also be bonded to the front of the display. The functionality of the glass front element for light distribution, contrast enhancement and seamless tiling is used in a similar way. Then it is possible to build up a direct view display wall, which very low seam below 0.5 mm. That will be one order of improvement compared to the today's solution showing ≈5.5 mm.

Figure 10:
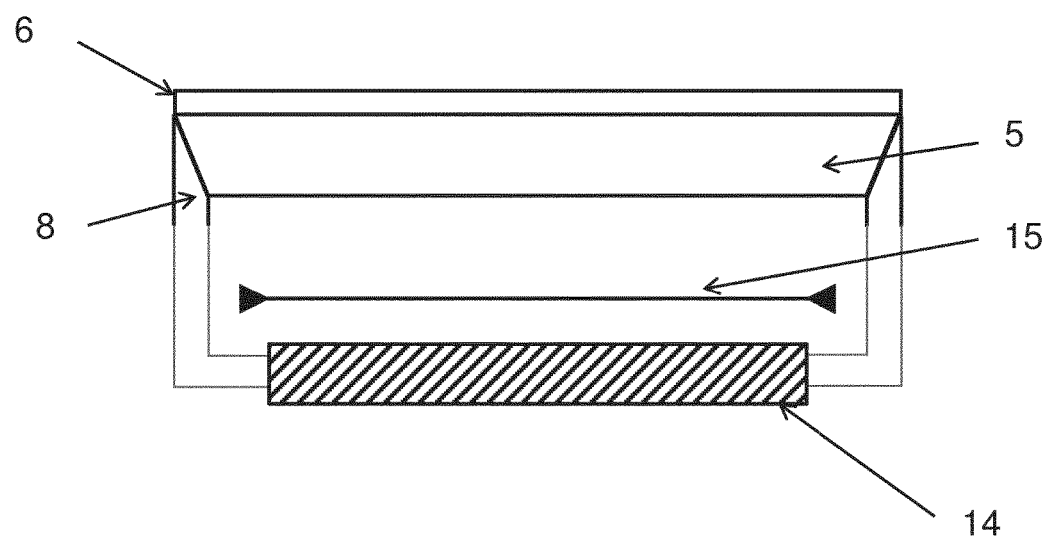
FIG. 10. Schematic representation of a tile in a direct view display according to an embodiment of the invention.

FIG. 10 shows how a single carrier substrate and associated functional layer can be used in a seamless tiled Liquid Crystal (LC) display. An LC panel fastened to a bezel is associated to a tile T. The bezel can be as large as e.g. 0.5 cm. The light from the LC panel arrives perpendicularly to a diverging Fresnel lens 15 which has the effect of enlarging the image formed on the LC panel. The image is formed on a tile T according to the invention: a carrier substrate supporting a diffusion layer with or without antiglare layer.

The image formed on the LC panel is enlarged to fill the tile T.

Figure 11:
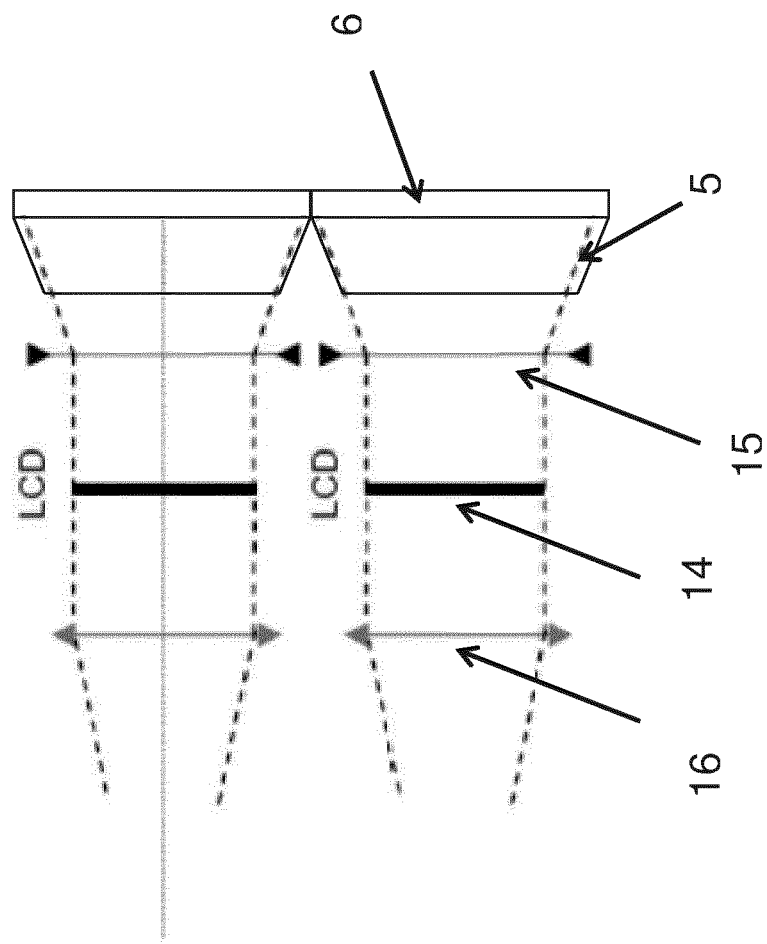
FIG. 11. Schematic representation of a direct view tiled display according to an embodiment of the invention.

FIG. 11 shows the outermost projected light rays on a cross section of two adjacent tiles T and their associated LC panel in a tiled display according to the invention.

In addition to a diverging Fresnel lens 15 enlarging the image formed on the LC panel 14; a Fresnel lens 16 is used for the backlight illuminating LC panel 14. Any kind of highly collimated backlight is favourable for good focus and increased contrast.

Figure 2:
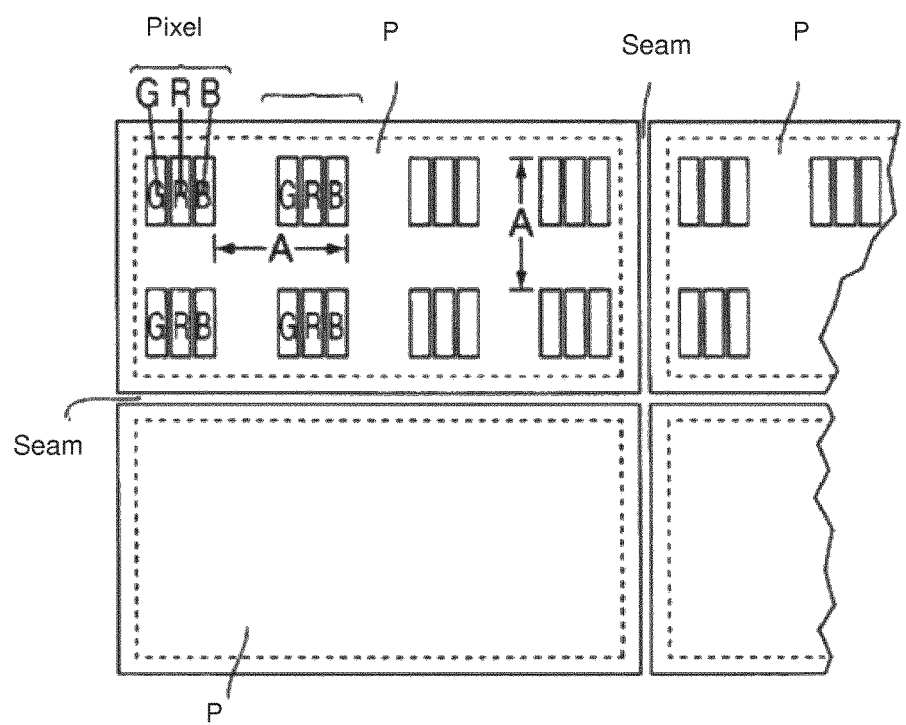
FIG. 2. Schematic representation of pixels on a tiled display.

The enlarged image is distributed by the diffusing layer 6 supported by a carrier substrate 5. The distance between the two adjacent carriers substrates is less than the spacing A between two adjacent pixels projected on the same tile T (as illustrated on FIG. 2) over the entire range of temperature within which the tiled display is operated.

An additional Fresnel Lens 17 can be positioned directly in front of the diffusion layer 6 and its carrier substrate 5 to collimate the light for better image uniformity. The cross section of a carrier substrate and mechanical fastening elements is such that there is no obstacle on the path of the outermost projected light rays to the diffusion layer 6. The simplest cross section for the carrier substrate 5 is trapezoidal as seen on FIG. 12. The borders of the image formed on the LC panel are projected along the borders of the diffusive layer 6.

The distance between two adjacent tiles being smaller than the distance A between two adjacent pixels on a tile T, the realized tiled display is considered seamless.

To allow contact between two adjacent carriers at the maximum temperature of operation, it is important to have some clearance 41 and 42 between the outermost lateral sides S1 and edges E1 of the carrier substrate 5 and the outermost surface element S2 of the mechanical fastening elements 8 and the outermost surface elements S3 of the frame F.

Mechanical tolerances and thermal expansion are taken into account when determining the value of Δ1 and Δ2 to minimize the seam between adjacent carrier substrates.

TABLE 1

| | | | |
|---|---|---|---|
| Diagonal of Tile. | 25 inches | 80 inches | Larger scale allows larger tiled screens. |
| Achievable Pixel Pitch | 1 mm | 0.1 mm | Smaller pitch enables high definition (HD) projection. |
| Resin | Soft Silicon Resin | Hard Acrylic Resin | Hard acrylic resin offers enough refraction for short-throw applications. |

TABLE 2

| Technology | Result | Effect |
|---|---|---|
| Knife | Not OK | Foil breaks. |

TABLE 2-continued

| Technology | Result | Effect |
| --- | --- | --- |
| Multiple Knives | Not OK | Foil still breaks albeit less often but process is time consuming. |
| Sawing | Not OK | Foil breaks. |
| Laser Cutting | Not OK | Foil melts and leaves a burr. |
| Milling | Not OK | Foil melts and leaves a burr. |
| Water Jet | OK | Foil remains intact, precision of 0.1 mm or less is possible. |

The invention claimed is:

1. A direct view or rear projection tiled display arrangement having tiles, each tile having a display screen and pixel locations, comprising:
   at least two adjacent tiles, each of the two adjacent tiles having at least one first substrate of a first material and at least one first layer of a second material fixed to the first substrate characterized in that the thickness of the at least one first layer is less than the thickness of the first substrate;
   the coefficient of thermal expansion of the first substrate is less than the coefficient of thermal expansion of the at least one first layer,
   wherein the at least one first substrate is fixed to a support frame, the geometry and dimensions of each tile being selected to reduce changes in alignment of the at least two adjacent tiles in the tiled display such that the distance between the at least two tiles is kept to less than 0.5 mm on the display screen, the at least one substrate having chamfers on lateral sides thereof forming first sloping glue surfaces, and the support frame having second sloping glue surfaces matching the first sloping glue surfaces and the first and second sloping glue surfaces are fixed together with a bounded temperature activated adhesive and the first and second sloping glue surfaces being such that the bounded temperature activated adhesive is resistant to long term creep and shear, and wherein the support frame of each tile is fastened to a support structure by mechanical fastening means.

2. The tiled display arrangement of claim 1, selected from:
   wherein a slope angle of the first sloping surfaces makes an acute angle to an optical axis of the tile normal to the tile, and
   wherein a slope angle of the first sloping surfaces makes an acute angle to an optical axis of the tile normal to the tile and the slope angle of sloping surfaces of opposing lateral sides slope at different angles such that there is no shear plane between the support and the at least one substrate that is parallel to the optical axis or orthogonal thereto.

3. The tiled display arrangement according to claim 1 wherein the first substrates of adjacent tiles can be brought in mechanical contact with each other.

4. The tiled display arrangement according to claim 1, wherein the coefficient of thermal expansion of the first substrate of the at least two tiles is lower or equal to $9.5 \times 10^{-6}/°K$ between 273° K and 373° K.

5. The tiled display arrangement according to claim 1, selected from
   wherein the first layer of second material has a Fresnel lens, and
   wherein the first layer of the second material has been modified by engraving to form a Fresnel lens, and
   wherein the first layer of second material is molded into a Fresnel lens, and
   wherein a Fresnel lens is glued or laminated on the first substrate.

6. The tiled display arrangement according to claim 5, selected from:
   further comprising a second substrate supporting a second layer, and
   further comprising a second substrate supporting a second layer wherein the second layer is fixed to the second substrate, or to a support frame, and
   further comprising a second substrate supporting a second layer, wherein the second substrate is made of a third material which is the same material as the first substrate, and
   further comprising a second substrate supporting a second layer wherein the second layer fixed to the second substrate is made of a fourth material different from the first material, and
   further comprising a second substrate supporting a second layer, wherein the second layer is fixed on the second substrate or deposited on the second substrate before being cured, and
   further comprising a second substrate supporting a second layer, wherein the second layer is glued or laminated on the second substrate.

7. The tiled display arrangement according to claim 6 selected from
   wherein the first and second substrates of each tile are fixed together, and
   wherein the first and second substrates of each tile are fixed together with a bounded temperature activated adhesive.

8. The tiled display arrangement according to claim 1, wherein the first substrate supports a liquid crystal image forming device.

9. The tiled display arrangement of claim 1, wherein the bounded temperature activated adhesive is a temperature activated adhesive tape.

10. The tiled display arrangement of claim 1, wherein the bounded temperature activated adhesive is a glue dispensed on a thin carrier foil for gluing together the first and second sloping glue surfaces.

11. A method of making a tiled display arrangement having at least two adjacent tiles for a rear projection or direct view display system, each tile being associated with a display screen with pixel locations, each of the two adjacent tiles having at least one first substrate of a first material, the method comprising:
   fixing at least one first layer of a second material to the first substrate characterized in that the thickness of the at least one first layer is less than the thickness of the first substrate; the coefficient of thermal expansion of the first substrate is less than the coefficient of thermal expansion of the at least one first layer and the geometry and dimensions of each tile are such that the distance between the at least two tiles is less than 0.5 mm on the display screen, fixing the at least one first substrate to a support frame, the at least one substrate having chamfers on lateral sides thereof forming first sloping glue surfaces, and the support having second sloping glue surfaces matching the first sloping glue surfaces and the first and second sloping glue surfaces are fixed together with a bounded temperature activated adhesive such that the shear and creep within the bounded temperature activated adhesive is reduced.

12. The method according to claim 11, wherein a slope angle of the first sloping surfaces makes an acute angle to an optical axis of the tile normal to the tile.

13. The method according to claim 11 further comprising bringing the first substrates of adjacent tiles into mechanical contact with each other.

14. The method according to claim 11, selected from:
further comprising forming a Fresnel lens on the first layer of second material, and wherein the first layer of the second material is modified by engraving to form a Fresnel lens, and
wherein the first layer of second material is molded into a Fresnel lens, and
wherein a Fresnel lens is glued or laminated on the first substrate, and
wherein the first layer of second material is deposited as a resin on the first substrate before being molded into a Fresnel lens and is cured on the first substrate, and
wherein a Fresnel lens is directly engraved in the first substrate.

15. The method according to claim 11, selected from:
wherein each display tile has a second substrate, further comprising fixing a second layer to the second substrate, and
wherein each display tile has a second substrate, and the second layer is deposited on the second substrate and then cured, and
wherein each display tile has a second substrate, and the second layer is glued or laminated on the second substrate, and
wherein each display tile has a second substrate, and the first and second substrates of each tile are fixed together, and
wherein each display tile has a second substrate, and the first and second substrates of each tile are fixed together with bounded temperature activated adhesive.

16. The method according to claim 11, wherein a second substrate is fixed to the support frame.

17. The method according to claim 11, further comprising supporting a liquid crystal image forming device with the first substrate.

18. The tile according to claim 11, wherein the coefficient of thermal expansion of the first substrate is lower or equal to $9.5 \times 10^{-6}/^\circ K$ between $273^\circ K$ and $373^\circ K$.

19. A tile for a tiled display arrangement for a rear projection or direct view display system, the tile having a display screen with pixel locations, comprising:
at least one first substrate of a first material having characteristics of rigidity and strength and at least one first layer of a second material fixed to the first substrate characterized in that the thickness of the at least one first layer is less than the thickness of the first substrate; the coefficient of thermal expansion of the first substrate is less than the coefficient of thermal expansion of the at least one first layer,
wherein the at least one first substrate is fixed to a support frame, the at least one substrate having chamfers on lateral sides thereof forming first sloping glue surfaces, and the support having second sloping glue surfaces matching the first sloping glue surfaces and the first and second sloping glue surfaces are fixed together with a bounded temperature activated adhesive such that the shear and creep within the bounded temperature activated adhesive is reduced.

20. The tile of claim 19, selected from:
wherein a slope angle of the first sloping surfaces makes as acute angle to an optical axis of the tile normal to the tile, and
wherein a slope angle of sloping surfaces of opposing lateral sides slope at different angles such that there is no shear plane between the support and the at least one substrate that is parallel to the optical axis or orthogonal thereto.

21. The tile according to claim 20, selected from:
wherein the first layer of second material has a Fresnel lens, and
wherein the first layer of the second material has been modified by engraving to form the Fresnel lens, and
wherein the first layer of second material is molded into a Fresnel lens, and
wherein the Fresnel lens is glued or laminated on the first substrate.

22. The tile according to claim 21, selected from:
further comprising a second substrate supporting a second layer, and
further comprising a second substrate supporting a second layer, wherein the second layer is fixed to the second substrate, and
further comprising a second substrate supporting a second layer, wherein the second substrate is made of a third material which is the same material as the first substrate, and
further comprising a second substrate supporting a second layer, wherein the second layer is made of a fourth material different from the first material, and
further comprising a second substrate supporting a second layer, wherein the second layer is deposited on the second substrate before being cured, and
further comprising a second substrate supporting a second layer, wherein the second layer is glued or laminated on the second substrate, and
wherein the first and second substrates of the tile are fixed together, and
further comprising a second substrate supporting a second layer, wherein the first and second substrates of the tile are fixed together with a bounded temperature activated adhesive.

23. The tile according to claim 19, wherein the first substrate supports a liquid crystal image forming device.

* * * * *